Nov. 10, 1925.   1,560,616
R. G. STALLARD
NUT LOCK
Filed March 18, 1925
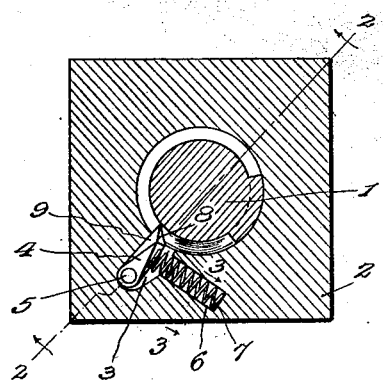
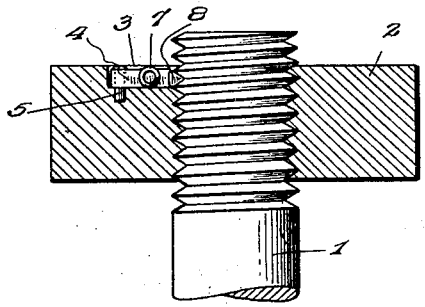
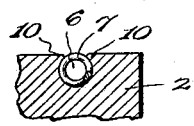
Inventor
R. G. Stallard.

Patented Nov. 10, 1925.

1,560,616

UNITED STATES PATENT OFFICE.

ROSWELL G. STALLARD, OF CENTRALIA, WASHINGTON.

NUT LOCK.

Application filed March 18, 1925. Serial No. 16,490.

*To all whom it may concern:*

Be it known that I, ROSWELL G. STALLARD, a citizen of the United States, residing at Centralia, in the county of Lewis and State of Washington, have invented certain new and useful Improvements in Nut Locks, of which the following is a specification.

This invention relates to nut locks and consists in certain novel features which will be hereinafter first fully described and then specifically pointed out in the appended claim.

In the annexed drawing:

Figure 1 is a view showing a diagrammatic section of a nut and bolt having my lock embodied therein;

Fig. 2 is a section on the line 2—2 of Fig. 1;

Fig. 3 is a detail section on the line 3—3 of Fig. 1, and

Fig. 4 is an enlarged detail view of the dog or locking pawl.

The nut lock may be applied to any standard bolt, a portion of such a bolt being shown at 1 in the accompanying drawing. The nut 2 is engaged with the bolt in the usual manner and is constructed in its outer side adjacent its threaded bore with a recess or chamber 3 in which the locking pawl or dog 4 is pivoted by having a pin 5 inserted through its outer end into the body of the nut. The recess 3 is substantially V-shaped and from the rear wall thereof a socket 6 extends into the body of the nut to receive a coiled spring 7 which bears at its forward end upon the back of the dog. As clearly shown in the drawing, the inner free end of the dog or pawl has its end face beveled, as shown at 8, whereby it is disposed at an angle to the circumference of the bolt and the front side of the dog presents two forwardly converging faces 9 whereby the inner free end of the dog is given a pointed wedge formation adapted to fit within the groove between and defined by adjacent threads of the bolt, as shown clearly in Fig. 2.

Upon referring to Fig. 1, it will be noted that the width of the dog is less than the width of the recess 3 so that there is space back of the dog to permit it to swing rearwardly. When the bolt has been turned through the nut so that its end reaches or extends slightly beyond the dog, the dog is in its normal position illustrated in Figs. 1 and 2. In this position the pointed wedge-like end of the pawl will fit within a groove of the bolt so that there is contact between the faces 9 of the dog and the opposed faces of adjacent threads on the bolt with the extremity of the dog engaging the base of the groove. The bolt may then be easily turned so as to be driven fully home. Any tendency of the bolt to rotate in the reverse direction so as to become loosened will result in the dog effecting a binding wedging engagement between the opposed faces of the adjacent threads of the bolt, the strength of the spring being sufficient to overcome the effort of the dog to swing backward under the frictional engagement with the bolt. The peculiar formation of the end of the dog presents three biting edges to the grooves of the bolt so that reverse movement of the bolt tends to instantly effect a biting binding engagement between the dog and the bolt and the bolt is, consequently, firmly held. If, however, it be desired to remove the bolt so as to permit repair or readjustment of the parts secured by it, a slight pressure upon the front face of the dog will move it rearwardly against the tension of the spring, whereupon the bolt may be withdrawn.

As shown most clearly in Fig. 3, the socket in which the spring 7 is seated is formed with overhanging side walls, as indicated at 10, whereby the spring will be prevented from slipping out through the face of the nut.

Having thus described the invention, I claim:

In combination with a threaded bolt and a nut thereon having a substantially V-shaped recess in its outer side disposed radially, with its enlarged end in communication with the bolt opening, and having a socket leading from a side of the recess and opening through the outer side of the nut, opposite longitudinal walls of the socket projecting inward to overhang the open side of the socket, of a coiled spring in the said socket, and a dog having its outer end seated against the outer small end of the said recess and pivoted therein, said dog engaging the spring and having its sides forwardly converged and its extremity rearwardly beveled to form a wedge-shaped point having opposite edges to bite into the walls of adjacent threads of the bolt.

In testimony whereof I affix my signature.

ROSWELL G. STALLARD. [L. S.]